United States Patent
Erhart et al.

(10) Patent No.: US 7,460,697 B2
(45) Date of Patent: Dec. 2, 2008

(54) ELECTRONIC FINGERPRINT SENSOR WITH DIFFERENTIAL NOISE CANCELLATION

(75) Inventors: Richard A. Erhart, Tempe, AZ (US); Darioush Keyvani, Scottsdale, AZ (US); Fred G. Benkley, III, Andover, MA (US); Jaswinder Jandu, Chandler, AZ (US)

(73) Assignee: Validity Sensors, Inc., San Jose, CA (US)

( * ) Notice: Subject to any disclaimer, the term of this patent is extended or adjusted under 35 U.S.C. 154(b) by 594 days.

(21) Appl. No.: 11/184,464

(22) Filed: Jul. 19, 2005

(65) Prior Publication Data

US 2007/0031011 A1 Feb. 8, 2007

(51) Int. Cl.
*G06K 9/00* (2006.01)

(52) U.S. Cl. .................. 382/124; 439/395; 326/16; 326/41; 324/661

(58) Field of Classification Search .......... 382/106, 382/107, 123, 124–127; 356/3–22, 27–28, 356/5, 71; 73/514.33; 361/280–282, 284–330; 324/661, 662, 686; 29/857, 825, 592.1; 701/9, 3; 347/245, 238; 439/395, 713, 535, 439/922, 676, 34, 540.1, 408; 326/16, 41, 326/44

See application file for complete search history.

(56) References Cited

U.S. PATENT DOCUMENTS

| | | | |
|---|---|---|---|
| 4,353,056 A | 10/1982 | Tsikos | |
| 4,525,859 A | 6/1985 | Bowles et al. | |
| 4,550,221 A | 10/1985 | Mabusth | |
| 5,076,566 A * | 12/1991 | Kriegel | 271/265.03 |
| 5,109,427 A | 4/1992 | Yang | |
| 5,305,017 A | 4/1994 | Gerpheide | |
| 5,325,442 A | 6/1994 | Knapp | |

(Continued)

FOREIGN PATENT DOCUMENTS

DE 2213813 10/1973

(Continued)

OTHER PUBLICATIONS

Search Report Mailed Sep. 26, 2002 for International Application No. PCT/US2001/46525.

(Continued)

*Primary Examiner*—Sheela C Chawan
(74) *Attorney, Agent, or Firm*—David R. Stevens; Stevens Law Group

(57) ABSTRACT

Image sensing apparatus includes an image pickup plate disposed generally orthogonally with respect to an expected direction of movement of an object, such as a finger, multiple image drive plates in spaced relation to the image pickup plate to define sensor gaps between respective image drive plates and the image pickup plate, and a reference plate disposed substantially parallel to the image pickup plate. The reference plate is spaced from the image pickup plate to permit common mode noise and coupling to be cancelled and is spaced from the image drive plates to permit a differential image signal to develop between the image pickup plate and the reference plate. A differential amplifier coupled to the image pickup plate and the reference plate provides noise cancellation. The apparatus may further include a comb plate spaced from the reference plate and coupled to a reference potential, such as ground.

21 Claims, 4 Drawing Sheets

U.S. PATENT DOCUMENTS

| | | | |
|---|---|---|---|
| 5,420,936 | A | 5/1995 | Fitzpatrick et al. |
| 5,627,316 | A | 5/1997 | De Winter et al. |
| 5,818,956 | A | 10/1998 | Tuli |
| 5,852,670 | A | 12/1998 | Setlak et al. |
| 5,940,526 | A * | 8/1999 | Setlak et al. ............... 382/124 |
| 6,002,815 | A | 12/1999 | Immega et al. |
| 6,016,355 | A | 1/2000 | Dickinson et al. |
| 6,259,108 | B1 | 7/2001 | Antonelli et al. |
| 6,289,114 | B1 | 9/2001 | Mainguel |
| 6,317,508 | B1 | 11/2001 | Kramer et al. |
| 6,320,394 | B1 | 11/2001 | Tartagni |
| 6,333,989 | B1 | 12/2001 | Borza |
| 6,346,739 | B1 | 2/2002 | Lepert et al. |
| 6,347,040 | B1 | 2/2002 | Fries et al. |
| 6,362,633 | B1 | 3/2002 | Tartagni |
| 6,400,836 | B2 | 6/2002 | Senior |
| 6,408,087 | B1 | 6/2002 | Kramer |
| 6,580,816 | B2 | 6/2003 | Kramer et al. |
| 6,643,389 | B1 * | 11/2003 | Raynal et al. ............... 382/124 |
| 6,672,174 | B2 | 1/2004 | Deconde et al. |
| 6,785,407 | B1 | 8/2004 | Tschudi et al. |
| 2001/0043728 | A1 | 11/2001 | Kramer et al. |
| 2002/0067845 | A1 * | 6/2002 | Griffis ..................... 382/107 |
| 2003/0035570 | A1 | 2/2003 | Benkley, III |
| 2003/0161512 | A1 | 8/2003 | Mathiassen et al. |
| 2003/0174871 | A1 * | 9/2003 | Yoshioka et al. ........... 382/124 |
| 2003/0224553 | A1 | 12/2003 | Manansala |
| 2004/0012773 | A1 | 1/2004 | Puttkammer |
| 2005/0100196 | A1 | 5/2005 | Scott et al. |

FOREIGN PATENT DOCUMENTS

| | | |
|---|---|---|
| EP | 1 018 697 A | 7/2000 |
| EP | 1 139 301 A2 | 10/2001 |
| EP | 1 531 419 A2 | 5/2005 |
| EP | 1 538 548 A2 | 6/2005 |
| GB | 2 331 613 A | 5/1999 |
| WO | WO 90/03620 A1 | 4/1990 |
| WO | WO 98/58342 A | 12/1998 |
| WO | WO 99/28701 A | 6/1999 |
| WO | WO 99/43258 A | 9/1999 |
| WO | WO 01/22349 A1 | 3/2001 |
| WO | WO 01/94902 A | 12/2001 |
| WO | WO 02/47018 A2 | 6/2002 |
| WO | WO 02/061668 A1 | 8/2002 |
| WO | WO 02/077907 A1 | 10/2002 |
| WO | WO 03/075210 A2 | 9/2003 |
| WO | WO 2004/066194 A1 | 8/2004 |
| WO | WO 2004/066693 A1 | 8/2004 |

OTHER PUBLICATIONS

Search Report Mailed Sep. 8, 2005 for International Application No. PCT/US2005/012792.

Search Report Mailed Dec. 12, 2005 for International Application No. PCT/US2005/013943.

Davide Maltoni, "*Handbook of Fingerprint Recognition*", XP002355942 Springer, New York, USA, Jun. 2003, pp. 65-69.

Vermesan et al., "*A 500-dpi AC Capacitive Hybrid Flip-Chip CMOS ASIC/Sensor Module for Fingerprint, Navigation, and Pointer Detection With On-Chip Data Processing*", IEEE Journal of Solid State Circuits, vol. 38, No. 12, Dec. 2003, pp. 2288-2294.

International Search Report and Written Opinion mailed Jan. 30, 2006 for Application No. PCT/US2005/035504.

International Search Report and Written Opinion mailed Nov. 9, 2006 for Application No. PCT/US2006/027060.

Search Report Mailed Dec. 22, 2005 for European Application No. EP 05021634.0-2218.

\* cited by examiner

US 7,460,697 B2

ELECTRONIC FINGERPRINT SENSOR WITH DIFFERENTIAL NOISE CANCELLATION

FIELD OF THE INVENTION

This invention relates to systems and methods for electronically sensing biometric features of an object, such as a fingerprint, and, more particularly, to methods and apparatus for electronic fingerprint sensing which utilize differential noise cancellation.

BACKGROUND OF THE INVENTION

Electronic fingerprint sensing has received increased attention as a technique for reliable identification of individuals. Electronic fingerprint sensing may be used in stationary equipment, such as security checkpoints, and in portable devices, such as mobile phones and other wireless devices, and smart cards. Accordingly, electronic fingerprint sensing systems are required to be compact, highly reliable and low in cost.

Various electronic fingerprint sensing methods have been proposed. Known methods include optical sensing and capacitive sensing with a two-dimensional array of electrodes.

Capacitive fingerprint sensing using a swiped finger technique is disclosed in International Publication No. WO 02/47018, published Jun. 13, 2002. Conductive elements, or plates, are formed on an insulating substrate to create a one-dimensional capacitive sensing array for detecting topographic variations in an object, such as a finger. The array includes multiple drive plates which are sequentially excited with short duration electronic waveform bursts. An orthogonal pickup plate spaced from each drive plate by a sensor gap and connected to a charge sensing circuit detects the intensity of the electric field created by each drive element. With each complete scan of the drive plates, a one-dimensional slice of the fingerprint is acquired. By swiping a finger across the gap between the drive plates and the pickup plate, and scanning the gap at a much faster rate than the swipe speed, a two-dimensional image based on capacitance is generated. The image represents the fingerprint.

Fingerprint sensors of this type provide satisfactory performance but are subject to parasitic coupling and noise combined with interference coupled through the body of the finger from finger ridges outside the sensor gap. Accordingly, there is a need for improved electronic fingerprint sensing apparatus and methods wherein the above effects are reduced.

SUMMARY OF THE INVENTION

According to a first aspect of the invention, image sensing apparatus comprises an image pickup plate disposed generally orthogonally with respect to an expected direction of movement of an object, such as a finger, a plurality of image drive plates in spaced relation to the image pickup plate to define a plurality of sensor gaps between respective image drive plates and the image pickup plate, and a reference plate disposed substantially parallel to the image pickup plate. The reference plate is spaced from the image pickup plate to permit common mode noise and coupling to be cancelled and is spaced from the image drive plates to permit a differential image signal to develop between the image pickup plate and the reference plate.

The image sensing apparatus may further comprise a comb plate spaced from the reference plate and coupled to a reference potential, such as ground. The comb plate may comprise substantially parallel, interconnected conductors disposed perpendicular to the reference plate and spaced from the reference plate. In some embodiments, an arrangement of the parallel, interconnected conductors of the comb plate relative to the reference plate may substantially match an arrangement of the image drive plates relative to the image pickup plate.

The signal on the reference plate is subtracted from the signal on the image pickup plate to provide an image signal in which noise and parasitic signals are substantially cancelled.

The image pickup plate, the plurality of image drive plates, the reference plate and the comb plate, if present, may comprise conductive traces on a substrate. The conductive traces may be substantially coplanar and may be dimensioned and spaced for sensing a fingerprint.

According to a second aspect of the invention, a fingerprint sensing system is provided. The fingerprint sensing system comprises an image sensor including an array of sensors for sensing ridge peaks and ridge valleys of a fingerprint on a moving finger, the image sensor configured as described above, a finger sensor for sensing a speed of the finger as it moves across the image sensor, and a sensor circuit for excitation of the image sensor with image drive signals and for detection of image signals between the image pickup plate and the reference plate in response to the image drive signals, for excitation of the finger sensor with finger drive signals and for detection of finger signals in response to the finger drive signals, and for coordinating the image signals and the finger signals to provide a fingerprint image.

The sensor circuit may comprise an excitation circuit for sequentially energizing the image drive plates with the image drive signals, and a detection circuit for detecting the image drive signals coupled from the image drive plates to the image pickup plate to provide the image signals. The detection circuit may include a differential amplifier having first and second differential inputs coupled to the image pickup plate and the reference plate, respectively.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
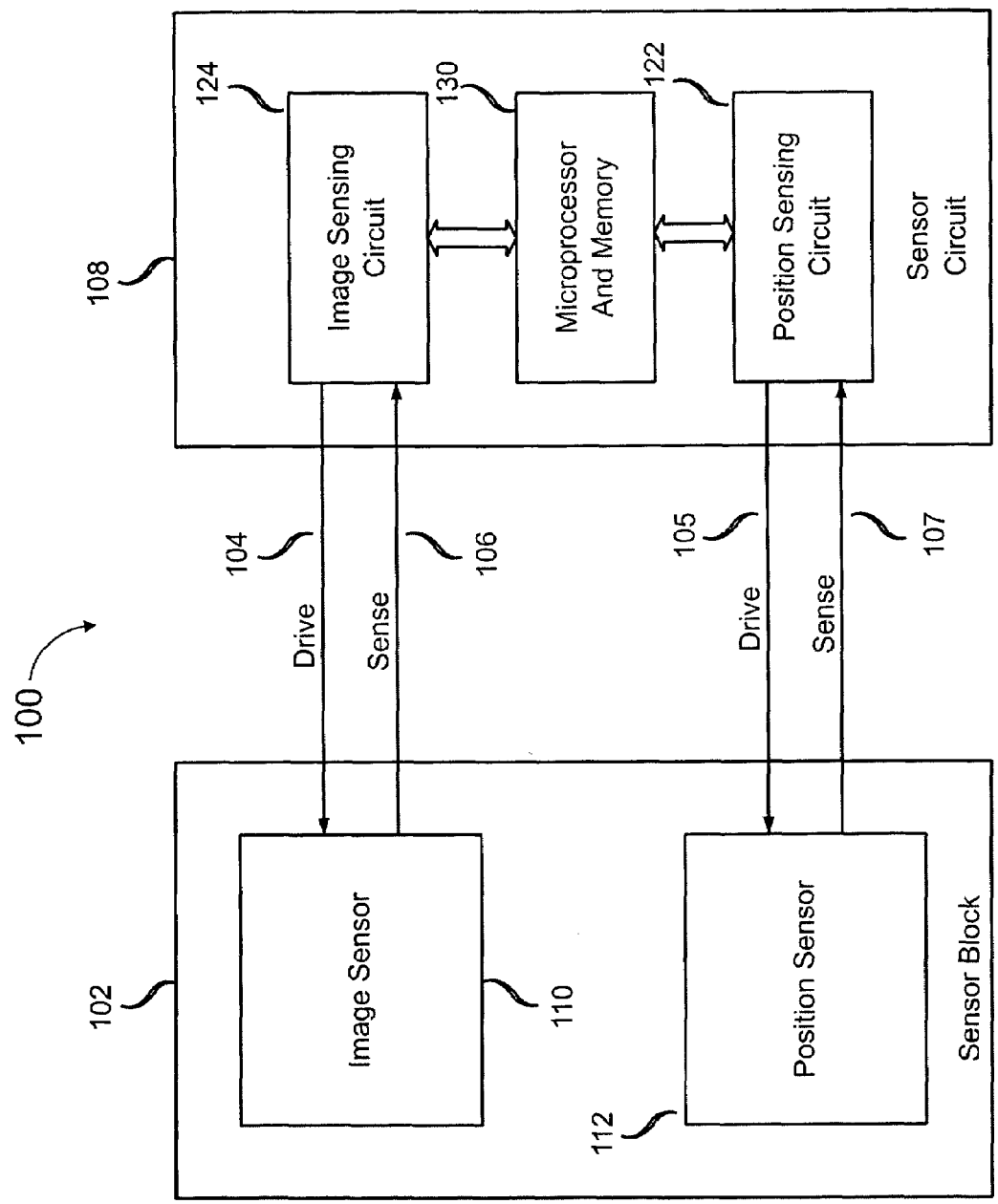
FIG. 1 is a block diagram of a fingerprint sensing system incorporating features of the present invention.

FIG. 1 shows a fingerprint sensing system 100 incorporating features of the present invention. A sensor block 102 receives drive signals from and delivers sense signals to a sensor circuit 108. Sensor block 102 includes an image sensor 110 and a position sensor 112. Image sensor 110 and position sensor 112 may be fabricated on a single substrate as described below. Sensor circuit 108 includes an image sensing circuit 124, a position sensing circuit 122 and a microprocessor and memory 130. Image sensor 110 receives drive signals 104 from and delivers sense signals 106 to image sensing circuit 124. Position sensor 112 receives drive signals 105 from and delivers sense signals 107 to position sensing circuit 122. Microprocessor and memory 130 acquires and processes image data and position data and controls operation of the system. The components of fingerprint sensing system 100 are described below.

Figure 2:
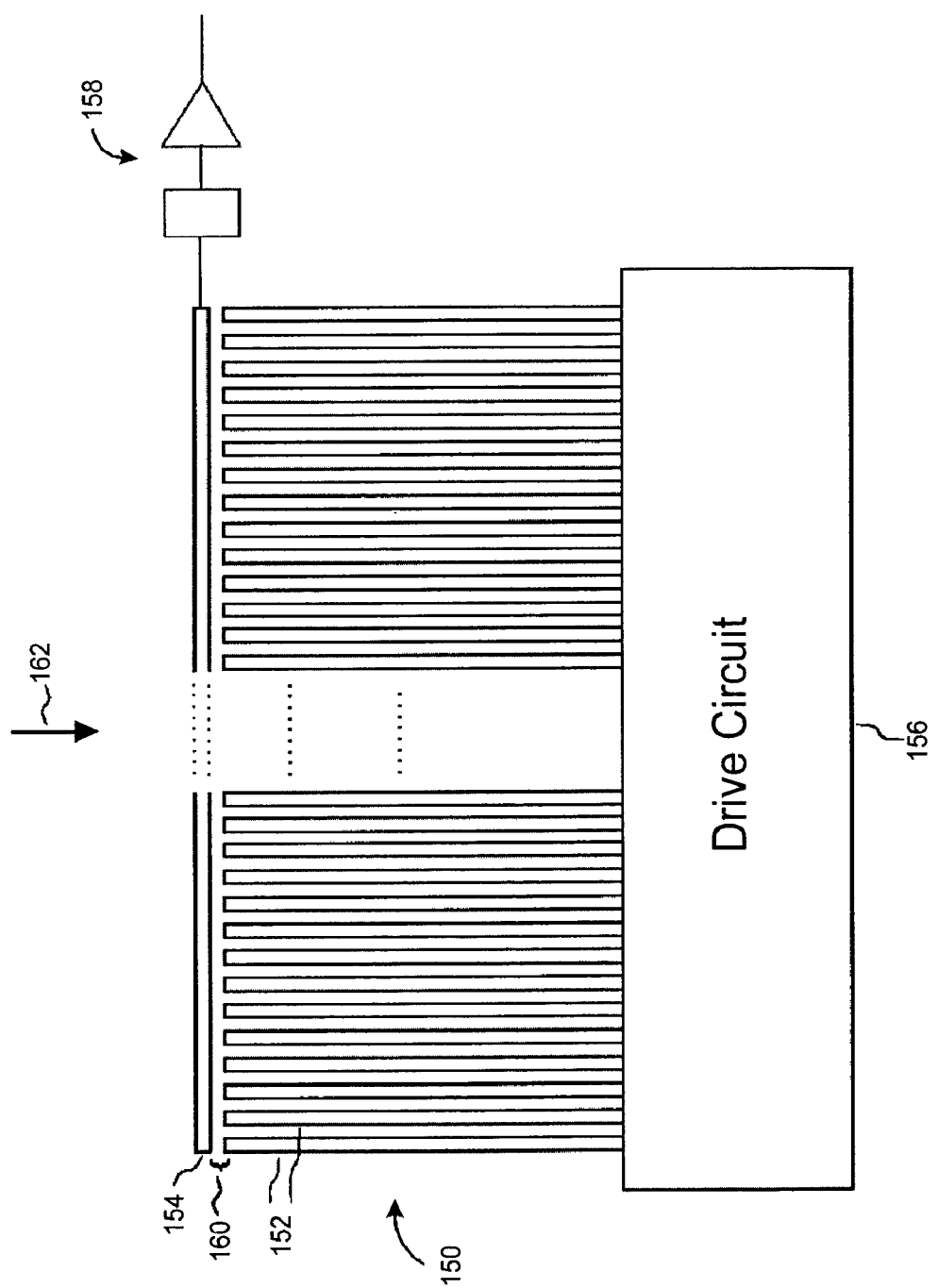
FIG. 2 shows a conventional fingerprint image sensor.

An image sensor as described in International Publication No. WO 02/47018 is shown in FIG. 2. An image sensor 150 includes multiple image drive plates 152 and an image pickup plate 154. Drive plates 152 are substantially parallel to each other and are connected to a drive circuit 156. Pickup plate 154 is disposed substantially perpendicular to drive plates 152. Each drive plate 152 is separated from pickup plate 154 by a sensor gap 160. Thus, image sensor 150 includes a linear array of sensor gaps 160 between respective drive plates 152 and pickup plate 154.

A finger is moved, or swiped, in a direction 162 perpendicular to pickup plate 154. A drive circuit 156 sequentially energizes drive plates 152 with drive signals. As ridge peaks and ridge valleys of the fingerprint pass over sensor gaps 160, the drive signals applied to drive plates 152 are capacitively coupled to pickup plate 154 according to the capacitances of the individual sensor gaps. The capacitance varies in accordance with the ridge peaks and ridge valleys of the fingerprint passing over the sensor gaps. The capacitively coupled drive signals are coupled to pickup plate 154 and are detected by a sensing circuit 158 to provide a line of the fingerprint image. Multiple slices of the fingerprint image are combined to form a complete fingerprint image.

Figure 3:
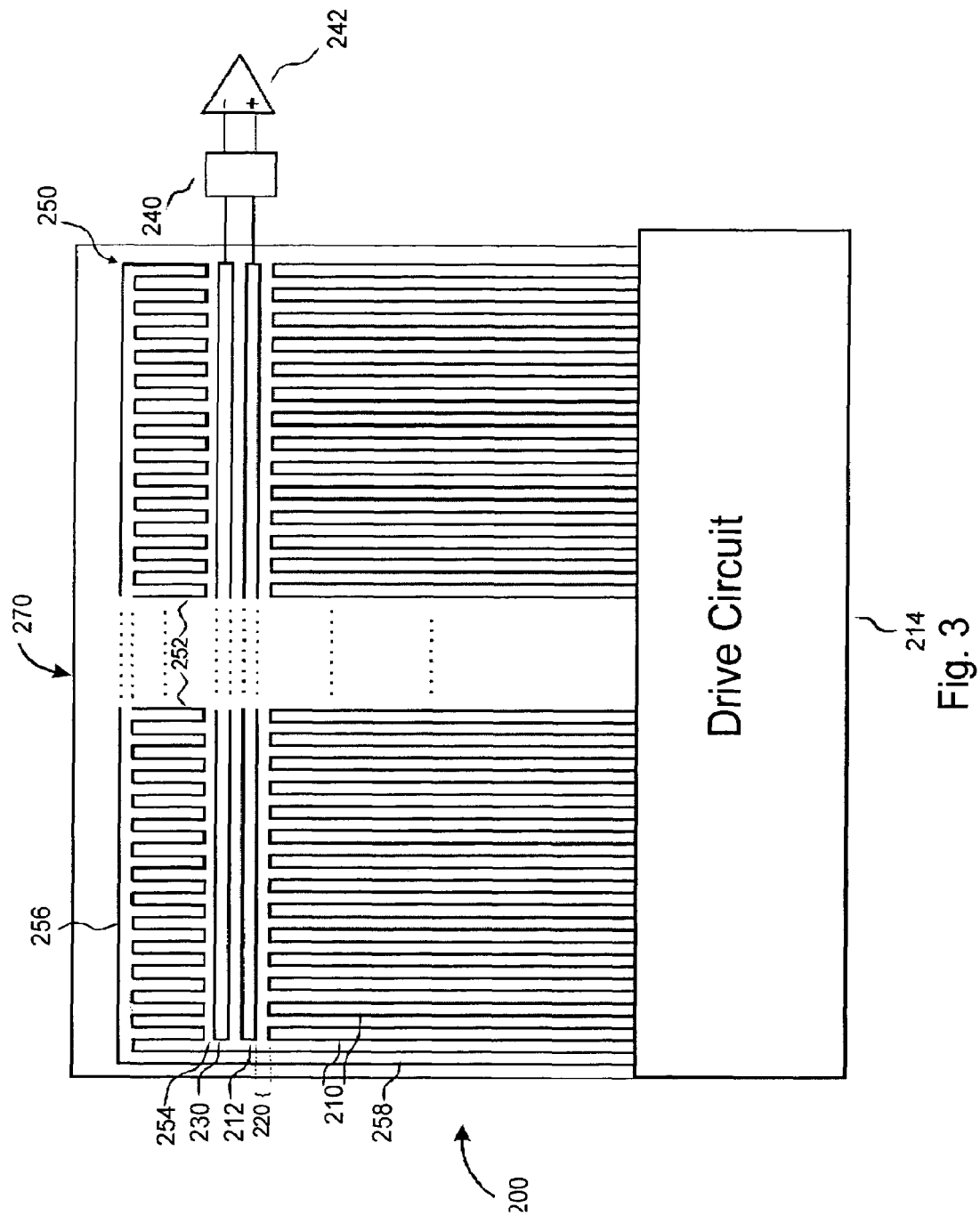
FIG. 3 shows a fingerprint image sensor according to an embodiment of the invention.

Fingerprint image sensors of the type shown in FIG. 2 provide satisfactory performance but are subject to parasitic coupling and noise picked up by the human body as well as interference coupled through the body of the finger from finger ridges outside the sensor gap. An improved image sensor wherein these effects are at least partially cancelled is shown in FIG. 3. An image sensor 200 includes multiple image drive plates 210 and an image pickup plate 212. Drive plates 212 are substantially parallel to each other and are connected to drive circuit 214, which may be part of image sensing circuit 124 shown in FIG. 1. Pickup plate 212 is disposed substantially perpendicular to drive plates 210. Each drive plate 210 is spaced from pickup plate by a sensor gap 220. Thus, image sensor 200 includes a linear array of sensor gaps 220 between respective drive plates 210 and pickup plate 212. Drive circuit 214 sequentially energizes drive plates 210 with drive signals.

Image sensor 200 further includes a reference plate 230 that may be substantially parallel to and spaced from pickup plate 212. Reference plate 230 is located on the opposite side of pickup plate 212 from drive plates 210 and thus is spaced from drive plates 210 by a greater distance than pickup plate 212. Reference plate 230 should be spaced from drive plates 210 by a distance that is sufficient to provide a noise and parasitic coupling reference for common mode noise cancellation. In some embodiments, reference plate 230 and pickup plate 212 may have equal lengths and widths and may be located in a parallel side-by-side arrangement. Reference plate 230 senses a ridge/valley signal similar to pickup plate 212 but substantially attenuated. Because reference plate 230 and pickup plate 212 are closely spaced and have similar dimensions, the two plates produce approximately equal noise and parasitic signals. Subtracting the signal on pickup plate 212 from the signal on reference plate 230 produces a ridge/valley signal proportional to the difference between the sensed signals, which is significant because of the relative spacings of the two plates from sensor gaps 220. However, the equally coupled noise and parasitic signals are cancelled by subtracting the signals on the two plates.

Pickup plate 212 and reference plate 230 are coupled through a differential bandpass filter 240 to a differential amplifier 242. Bandpass filter 240 and differential amplifier 242 are part of image sensing circuit 124 (FIG. 1). In particular, pickup plate 212 may be coupled through filter 240 to a non-inverting input of differential amplifier 242, and reference plate 230 may be coupled through filter 240 to an inverting input of differential amplifier 242. Differential amplifier 242 electronically subtracts the signals on pickup plate 212 and reference plate 230, so that noise and parasitic signals are cancelled. It will be understood by those skilled in the art that the connections between image sensor 200 and differential amplifier 242 can be reversed within the scope of the invention.

Image sensor 200 may further include a comb plate 250 spaced from reference plate 230. As shown in FIG. 3, comb plate 250 may include substantially parallel conductors 252 disposed perpendicular to reference plate 230 and spaced from reference plate 230 by gaps 254. Parallel conductors 252 are electrically interconnected by a conductor 256 and are connected to drive circuit 214 by conductor 258. In some embodiments, the arrangement of parallel conductors 252 relative to reference plate 230 matches the arrangement of drive plates 210 relative to pickup plate 212. Thus, the widths of parallel conductors 252, the spacing between parallel conductors 252 and the dimensions of gaps 254 may be the same as the widths of drive plates 210, the spacing between drive plates 210 and the dimensions of sensor gaps 220, respectively.

Comb plate 250 may be coupled to a reference potential, such as ground, during fingerprint image sensing. Thus, at any instant of time during fingerprint image sensing, one of drive plates 210 may be energized with a drive signal and the remaining drive plates 210 are coupled to a reference potential, such as ground. For the example of an image sensor 200 having 250 drive plates 210, all but one of the 250 drive plates 210 are coupled to ground at any given time and all of parallel conductors 252 of comb plate 250 are coupled to ground at any given time during image sensing. With this arrangement, noise on the ground conductors is coupled substantially equally to pickup plate 212 and reference plate 230. The coupled noise is subtracted by differential amplifier 242 and thereby is cancelled. The fingerprint image signal of interest is sensed between pickup plate 212 and reference plate 230, and is not cancelled by differential amplifier 242.

Pickup plate 212, drive plates 210, reference plate 230 and comb plate 250 may be substantially coplanar, conductive traces on a substrate 270. The substrate 270 may be any suitable insulating material. In some embodiments, the substrate may be flexible so that it confirms to the macro contours of the finger. However, a flat substrate may be utilized without impairing the performance of the position sensor. The substrate may be a rigid or flexible printed circuit board, and the drive plates and the pickup plate may be formed using conventional deposition, etching and photolithography techniques.

In one example of image sensor 200, drive plates 210 had widths of 25 μm (micrometers) and the spacing between adjacent drive plates 210 was 25 μm. The sensor gaps 220 had dimensions of 32 μm. A spacing between pickup plate 212 and reference plate 230 was 32 μm. Parallel conductors 252 of comb plate 250 had widths of 25 μm and a spacing between adjacent conductors 252 was 25 μm. The gaps 254 had dimensions of 32 μm. It will be understood that these dimensions are given by way of example only and are not limiting as to the scope of the present invention. In general, sensor gaps 220 have dimensions less than the ridge spacing in a typical fingerprint and are typically in a range of 25 to 50 μm.

Figure 4:
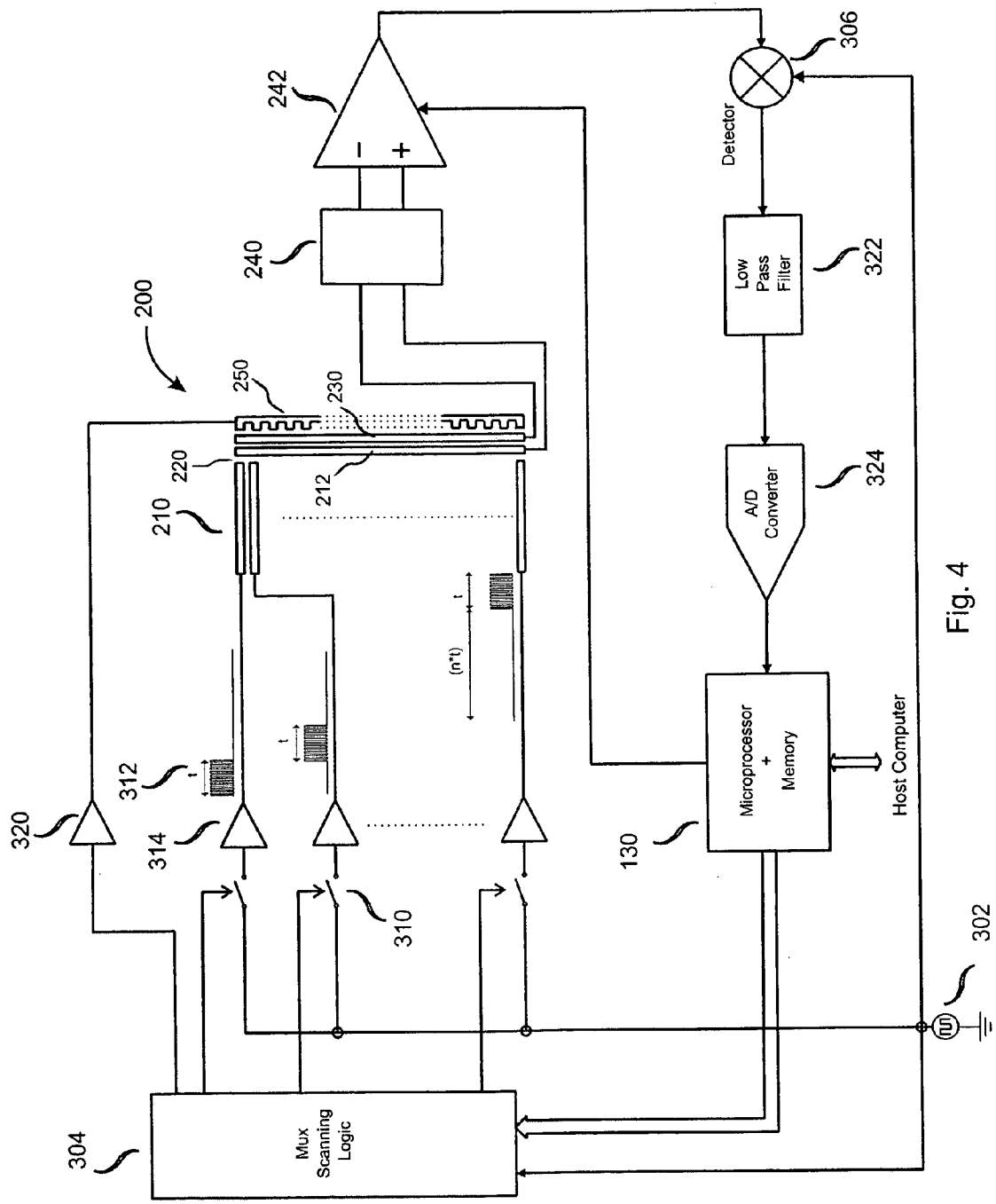
FIG. 4 is a block diagram of an image sensing circuit according to an embodiment of the invention.

An embodiment of image sensing circuit 124 and microprocessor and memory 130 of FIG. 1 are shown in FIG. 4. A master clock 302 provides a clock signal to mux scanning logic 304 and a detector 306. Master clock 302 can operate over a range of frequencies, for example, 20-80 MHz, but is not limited to this range. Microprocessor and memory 130 generates control signals for mux scanning logic 304. Outputs of mux scanning logic 304 serve as control inputs to switches 310.

The clock signal from master clock 302 is gated by switches 310 to provide signal bursts. A low impedance buffer 314 activates each image drive plate 210 with a signal burst 312. Signal bursts 312 are generated by standard circuit elements known to those skilled in the art and are derived from a common reference frequency or master clock 302.

Mux scanning logic 304 may sequentially activate switches 310 to scan the image drive plates. In one embodiment, master clock 302 operates at 48 MHz, and is divided down to 16 MHz before being supplied to buffers 314. Each switch 310 is gated on for about 0.5-5 microseconds. The sequential signal bursts 312 applied to the drive plates provide a scan of the image sensor 200. Because the scan speed is fast in comparison with the finger swipe speed, multiple lines of a fingerprint image can be acquired.

The drive plates 210 of image sensor 200 are energized sequentially, but need not be energized in any particular order. Further, the drive plates need not be energized with bursts of master clock 302, but may be energized by any periodic signal, such as a sinewave.

When its control input is activated, each switch 310 supplies a signal burst from master clock 302 to buffer 314. Signal burst 312 output by buffer 314 is coupled from one of the drive plates 210 to pickup plate 212. The coupled signal is a function of the fingerprint features of a finger in contact with the image sensor 200. When the control input to switch 310 is not activated, buffer 314 drives its connected drive plate to ground. Any parasitic fields between the energized drive plate and the non-energized drive plates are therefore shorted to ground. Pickup plate 212 detects the signal bursts and provides the coupled signals to bandpass filter 240. In addition, a buffer 320 drives comb plate 250 to ground during image sensing.

Bandpass filter 240 may be centered at the frequency of master clock 302 and may have a Q of 10. The output from bandpass filter 240 is supplied to differential amplifier 242, which may have variable gain. The gain of differential amplifier 242 may be controlled by microprocessor and memory 130. The gain may be adjusted to provide a desired output level despite variable sensing conditions.

The output of differential amplifier 242 is demodulated in detector 306. Detector 306 performs synchronous envelope detection of signal bursts 312. The output of detector 306 is a baseband pulse that represents the envelope of the coupled signal burst. In an alternative embodiment, synchronous rectification may be used for envelope extraction. The amplitude of the pulse output by detector 306 is a function of the magnitude of the signal coupled from the drive plate 210 to the pickup plate 212. The pulse amplitude modulated signal is supplied to a low pass filter 322. Low pass filter 322 removes unwanted high frequency harmonics produced by the demodulation process. Low pass filter 322 may have group delay characteristics that compensate for phase distortions that occurred in the previous signal processing stages. Low pass filter 322 may be optimized for processing the information coming out of the detector 306 at the rate at which the drive plates are scanned.

An analog-to-digital converter 324 converts the output of low pass filter 322 to a digital value. Analog-to-digital converter 324, for example, may have a resolution of 8-12 bits and is therefore capable of resolving the output of low pass filter 322 into 256 to 4096 values in this example. Analog-to-digital converter 324 operates at a sufficient speed (e.g. 1 megasamples/sec) to accommodate the scanning of image sensor 200. Microprocessor and memory 130 receives the output of analog-to-digital converter 324 and stores it in a buffer. Each stored digital value represents the coupled signal between a drive plate 210 and the pickup plate 212 when the drive plate was energized by signal burst 312.

Each scan of image sensor 200 acquires a slice of a fingerprint image. The stored digital values represent multiple slices of the fingerprint image and are used to generate a fingerprint image.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. Image sensing apparatus comprising:
   an image pickup plate disposed generally orthogonally with respect to an expected direction of movement of an object;
   a plurality of image drive plates in spaced relation to said image pickup plate to define a plurality of sensor gaps between respective image drive plates and said image pickup plate; and
   a reference plate disposed substantially parallel to the image pickup plate, wherein the reference plate is spaced from the image pickup plate to permit common mode noise and coupling to be cancelled and is spaced from the image drive plates to permit a differential image signal to develop between the image pickup plate and the reference plate.

2. Image sensing apparatus as defined in claim 1, further comprising a substrate, wherein said image pickup plate, said plurality of image drive plates and said reference plate comprise conductive traces on said substrate.

3. Image sensing apparatus as defined in claim 1, wherein said image pickup plate, said plurality of image drive plates and said reference plate are substantially coplanar.

4. Image sensing apparatus as defined in claim 1, wherein said image pickup plate, said plurality of image drive plates and said reference plate are dimensioned and spaced for sensing a fingerprint.

5. Image sensing apparatus as defined in claim 4, wherein each of said sensor gaps has a dimension that is less than about one half the ridge spacing on a typical fingerprint.

6. Image sensing apparatus as defined in claim 1, wherein said image drive plates comprise parallel conductors disposed perpendicular to said image pickup plate and said reference plate.

7. Image sensing apparatus as defined in claim 1, further comprising a comb plate in spaced relation to said reference plate.

8. Image sensing apparatus as defined in claim 7, wherein said comb plate comprises substantially parallel, interconnected conductors disposed perpendicular to said reference plate and spaced from said reference plate.

9. Image sensing apparatus as defined in claim 8, wherein an arrangement of the parallel, interconnected conductors relative to said reference plate substantially matches an arrangement of the image drive plates relative to the image pickup plate.

10. Image sensing apparatus as defined in claim 1, further comprising:
an excitation circuit for sequentially energizing said image drive plates with the drive signals; and
a detection circuit for detecting the drive signals coupled from said image drive plates to said image pickup plate to provide the image signal.

11. Image sensing apparatus as defined in claim 10, wherein the drive signals comprise signal bursts supplied sequentially to respective ones of said image drive plates and wherein said excitation circuit includes circuitry for coupling non-energized image drive plates to a reference potential.

12. Image sensing apparatus as defined in claim 10, wherein said detection circuit includes a differential amplifier having first and second differential inputs coupled to the image pickup plate and the reference plate, respectively.

13. Image sensing apparatus as defined in claim 10, further comprising a comb plate in spaced relation to said reference plate, wherein said excitation circuit includes circuitry for coupling non-energized image drive plates and said comb plate to a reference potential.

14. A fingerprint sensing system comprising:
an image sensor including an array of sensors for sensing ridge peaks and ridge valleys of a fingerprint on a moving finger, said image sensor comprising:
an image pickup plate disposed generally orthogonally with respect to an expected direction of movement of the finger;
a plurality of image drive plates in spaced relation to said image pickup plate to define a plurality of sensor gaps between respective image drive plates and said image pickup plate; and
a reference plate disposed substantially parallel to the image pickup plate, wherein the reference plate is spaced from the image pickup plate to permit common mode noise and coupling to be cancelled and is spaced from the image drive plates to permit a differential image signal to develop between the image pickup plate and the reference plate;
a finger sensor for sensing a speed of the finger as it moves across the image sensor; and
a sensor circuit for excitation of the image sensor with image drive signals and for detection of image signals between the image pickup plate and the reference plate in response to the image drive signals, for excitation of said finger sensor with finger drive signals and for detection of finger signals in response to said finger drive signals, and for coordinating said image signals and said finger signals to provide a fingerprint image.

15. A fingerprint sensing system as defined in claim 14, further comprising a substrate, wherein said image pickup plate, said plurality of image drive plates and said reference plate comprise conductive traces on said substrate.

16. A fingerprint sensing system as defined in claim 14, wherein said image pickup plate, said plurality of drive plates and said reference plate are substantially coplanar.

17. A fingerprint sensing system as defined in claim 14, wherein said image sensor further comprises a comb plate in spaced relation to said reference plate.

18. A fingerprint sensing system as defined in claim 17, wherein said comb plate comprises substantially parallel, interconnected conductors disposed perpendicular to said reference plate and spaced from said reference plate.

19. A fingerprint sensing system as defined in claim 14, wherein said sensor circuit comprises:
an excitation circuit for sequentially energizing said image drive plates with said image drive signals; and
a detection circuit for detecting the image drive signals coupled from said image drive plates to said image pickup plate to provide said image signals.

20. A fingerprint sensing system as defined in claim 19, wherein said detection circuit includes a differential amplifier having first and second differential inputs coupled to said image pickup plate and said reference plate, respectively.

21. A fingerprint sensing system as defined in claim 19, wherein said image sensor further comprises a comb plate in spaced relation to said reference plate, wherein said excitation circuit includes circuitry for coupling non-energized image drive plates and said comb plate to a reference potential.

* * * * *